United States Patent
Schunk et al.

(10) Patent No.: US 9,188,750 B2
(45) Date of Patent: Nov. 17, 2015

(54) OPTICAL DATA COMMUNICATION MODULE WITH SLIDING FIBER CLAMP SLEEVE

(71) Applicant: Avago Technologies General IP (Singapore) Pte. Ltd., Singapore (SG)

(72) Inventors: Nikolaus W. Schunk, Maxhuette-Haidhof (DE); Markus H. Schwarzfischer, Roding (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 351 days.

(21) Appl. No.: 13/870,692

(22) Filed: Apr. 25, 2013

(65) Prior Publication Data

US 2014/0321820 A1    Oct. 30, 2014

(51) Int. Cl.
*G02B 6/36* (2006.01)
*G02B 6/42* (2006.01)

(52) U.S. Cl.
CPC .............. *G02B 6/4219* (2013.01); *G02B 6/426* (2013.01); *Y10T 29/49128* (2015.01)

(58) Field of Classification Search
None
See application file for complete search history.

(56) References Cited

U.S. PATENT DOCUMENTS

| | | | |
|---|---|---|---|
| 5,926,597 A | 7/1999 | Tagashira et al. | |
| 8,011,834 B2 | 9/2011 | Nakano et al. | |
| 2011/0103748 A1* | 5/2011 | Ott | 385/78 |
| 2011/0188812 A1* | 8/2011 | Han et al. | 385/77 |
| 2012/0057830 A1 | 3/2012 | Taira et al. | |
| 2012/0063723 A1* | 3/2012 | Jenkins et al. | 385/78 |

OTHER PUBLICATIONS

Fiber Optic System Components, pp. 84-95. Hyperline Systems Inc. [online]. [retrieved on Apr. 9, 2013]. Retrieved from the Internet: <http://www.hyperline.com/img/sharedimg/pdf/hyperline84-95.pdf>.

Fiber Optic Connectors and Adapters Catalogue. FibreFab Ltd. [online]. [retrieved on Apr. 9, 2013]. Retrieved from the Internet: <http://www.fibrefab.com/ecats/ff-connectors-adaptors/index.html>.

* cited by examiner

*Primary Examiner* — Tina Wong

(57) ABSTRACT

An optical data communication module assembly includes a mountable module body, a fiber guide tube having one end attached to the module body, and a fiber clamp sleeve having a barrel retained within the other end of the fiber guide tube. The interior of the fiber guide tube and exterior of the fiber clamp sleeve have correspondingly tapered diameters and mating engagements. Sliding the fiber clamp sleeve within the fiber guide tube can engage and disengage these mating engagements and also clamp and unclamp an optical fiber within the fiber guide tube.

24 Claims, 13 Drawing Sheets

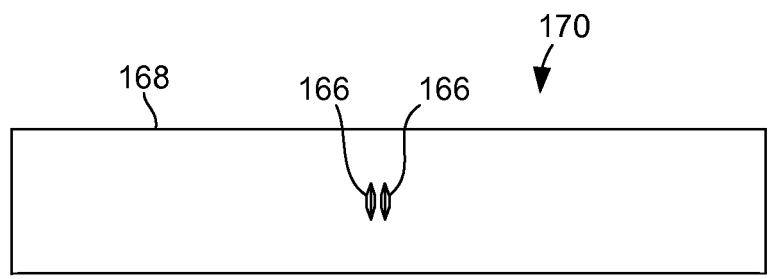
FIG. 23
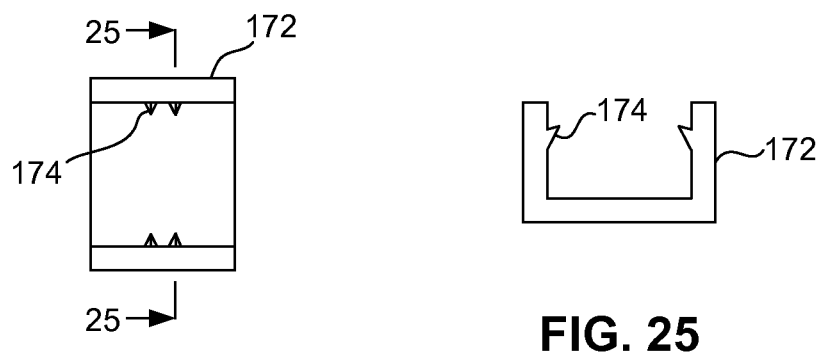
FIG. 24
FIG. 25
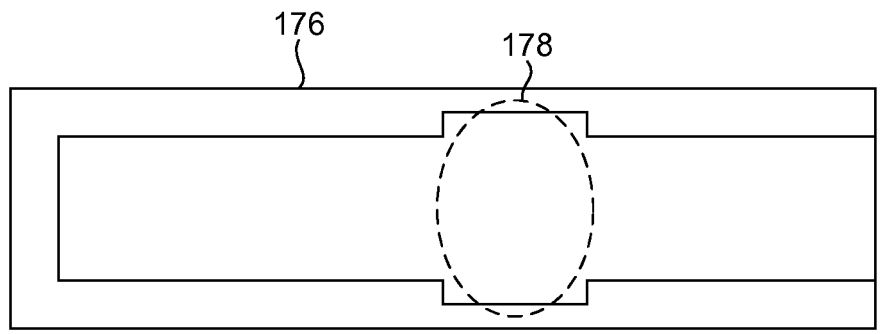
FIG. 26

OPTICAL DATA COMMUNICATION MODULE WITH SLIDING FIBER CLAMP SLEEVE

BACKGROUND

In data communication systems, it is often useful to modularize interface electronics and other interface elements in a data communication module. For example, in an optical data communication system, such a module may include a light source such as a laser, a light receiver such as a photodiode, or both a light source and a light receiver. To use an optical data communication module, an optical fiber cable is coupled to a port in the module. Such a module also includes electrical contacts that can be coupled to an external electronic system.

In an instance in which the end of an optical fiber is terminated with a plug, the optical fiber can be coupled to an optical data communication module by plugging the plug into a receptacle on the module. In some instances, however, it is desirable to couple a bare fiber (i.e., a fiber not terminated with a plug) to an optical data communication module. Modules of this type are commonly intended for use with economical plastic optical fiber (POF). Absent a retaining mechanism, the end of a POF that has been inserted into a receptacle in such a module can be pulled out of the receptacle inadvertently. To overcome this problem, various fiber-retaining mechanisms have been developed for optical data communication modules. For example, one such retaining mechanism includes a barrel-shaped receptacle that can be rotated in a screw-like manner to clamp a fiber that has been inserted into the receptacle. Another such retaining mechanism includes a sliding actuator that is slid from one position to another to clamp a fiber that has been inserted into the receptacle.

Modules having fiber-retaining clamp mechanisms are typically significantly larger than the opto-electronic elements housed within them, because the mechanisms occupy a significant amount of space. Also, the electrical leads that extend from the module housing are typically part of a relatively complex and uneconomical arrangement of electrical conductors. It would be desirable to provide a compact optical data communication module having an economical and convenient fiber-retaining clamp mechanism and arrangement of electrical leads.

SUMMARY

Embodiments of the present invention relate to an optical data communication module and method for using the optical data communication module. In an exemplary embodiment, an optical data communication module assembly includes a mountable module body, a fiber guide tube, and a fiber clamp sleeve. The module body includes a leadframe and an opto-electronic converter semiconductor chip mounted in the module body on a substantially planar central region of the leadframe. Electrical leads of the leadframe extend from the central region to an exterior of the module body. The fiber guide tube is aligned with the opto-electronic converter along an optical axis extending from the module body in a direction normal to the central region of the leadframe. The interior region of the fiber guide tube has a portion with a tapering diameter and has a fiber guide tube engagement. The fiber clamp sleeve has a collar outside the fiber guide tube and has a tapering barrel portion that can be slid or moved in an axial direction within the portion of the fiber guide tube having the tapering diameter. The exterior region of the barrel portion has a fiber clamp sleeve engagement that a user can engage with the fiber guide tube engagement by sliding the barrel portion within the portion of the fiber guide tube having the tapering diameter. Sliding the barrel portion in this manner can result in the fiber clamp sleeve and fiber guide tube attaining a state in which they are retained in fixed relation each other. The interior region of the barrel portion has a fiber clamp that is displaced in a radially inward direction by movement of the fiber guide tube engagement and fiber clamp sleeve engagements into engagement with each other.

In the exemplary embodiment, a method for using the above-described optical data communication module includes mounting the module body, inserting a tapering barrel portion of the fiber clamp sleeve into an interior region of the fiber guide tube having a portion with a tapering diameter, inserting an optical fiber into the barrel portion of the fiber clamp sleeve until an end of the optical fiber reaches the module body, and sliding the barrel portion within the portion of the fiber guide tube having the tapering diameter until a fiber clamp sleeve engagement on an exterior region of the barrel portion engages a fiber guide tube engagement on the interior region of the fiber guide tube and the fiber clamp sleeve is retained in fixed relation to the fiber guide tube and until a fiber clamp on an interior region of the barrel portion is displaced in a radially inward direction.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

FIG. 23 is a top plan view showing an optical fiber having notches.

FIG. 24 is a top plan view of a cutting tool for cutting notches in an optical fiber.

FIG. 25 is a sectional view taken on line 25-25 of FIG. 24.

FIG. 26 is a top plan view of a receptacle tool for receiving the cutting tool of FIG. 24 and an optical fiber.

DETAILED DESCRIPTION

Figure 1:
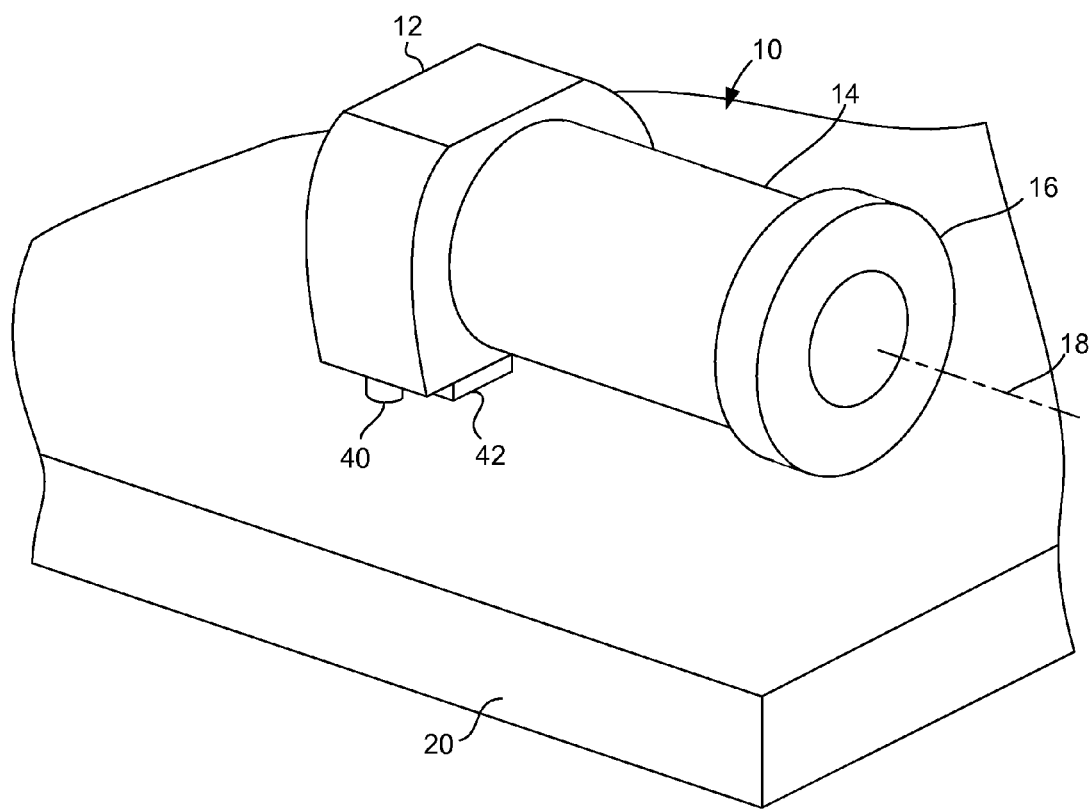
FIG. 1 is a perspective view of an optical data communication module assembly, showing the module assembly mounted on a printed circuit board in accordance with an exemplary embodiment of the invention.

As illustrated in FIG. 1, in an illustrative or exemplary embodiment of the invention, an optical data communication module assembly 10 includes a module body 12, a fiber guide tube 14, and a fiber clamp sleeve 16. One end of fiber guide tube 14 is attached to module body 12. The other end of fiber guide tube 14 receives fiber clamp sleeve 16. Fiber guide tube 14 and fiber clamp sleeve 16 are coaxially aligned with an optical axis 18 of optical data communication module assembly 10. Module body 12 is mounted on a surface of a printed circuit board 20, such as, for example, a computer motherboard, in an orientation in which fiber guide tube 14 is substantially parallel to the surface of printed circuit board 20. Module body 12, fiber guide tube 14, and fiber clamp sleeve 16 can all be made of, for example, economical molded plastic.

Figure 2:
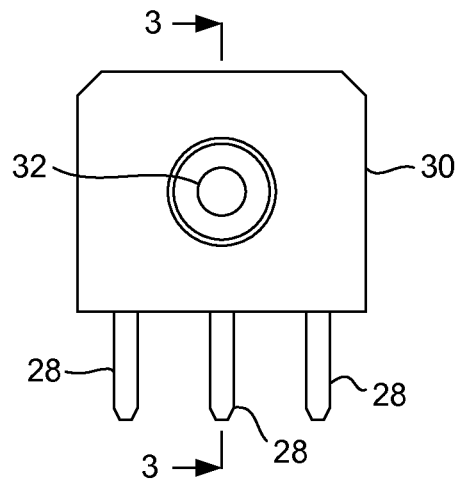
FIG. 2 is a front elevation view of a molded plastic body encapsulating the opto-electronic chip and leadframe of the optical data communication module of FIG. 1
Figure 3:
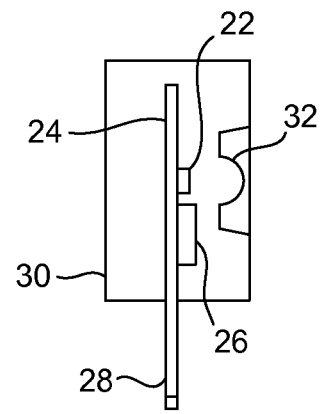
FIG. 3 is a sectional view taken on line 3-3 of FIG. 2.

As illustrated in FIGS. 2-3, an opto-electronic converter chip 22 (i.e., a semiconductor die) is mounted on a surface of a lead frame 24 in a flat central region of the lead frame. Opto-electronic converter chip 22 can be, for example, a laser, such as a vertical cavity surface-emitting laser (VCSEL) or, alternatively, a photodiode, such as a positive-intrinsic-negative (PIN) photodiode. A processing chip 26, such as a driver or receiver, is also mounted on lead frame 24. Processing chip 26 can communicate electrical signals with leads 28 of lead frame 24. In embodiments in which opto-electronic converter chip 22 is a laser, it can receive electrical signals via processing chip 26, which serves as a laser driver. In such embodiments, opto-electronic converter chip 22 converts the electrical signals into optical signals that it emits along optical axis 18. In embodiments in which opto-electronic converter chip 22 is a photodiode, it can receive optical signals along optical axis and convert them into electrical signals. In such embodiments, processing chip 26, serving as a signal receiver, can amplify or otherwise process the electrical signals and output the resulting signals to leads 28.

Opto-electronic converter chip 22, processing chip 26, and the central region of lead frame 24 are encapsulated within a molded plastic body 30. Molded plastic body 30 can be a unitary or continuous piece of plastic material that is transparent to the wavelength of the above-referenced optical signals. Leads 28 extend from body 30. A lens 32 is included in molded plastic body 30 and is aligned along optical axis 18 with opto-electronic converter chip 22.

Figure 4:
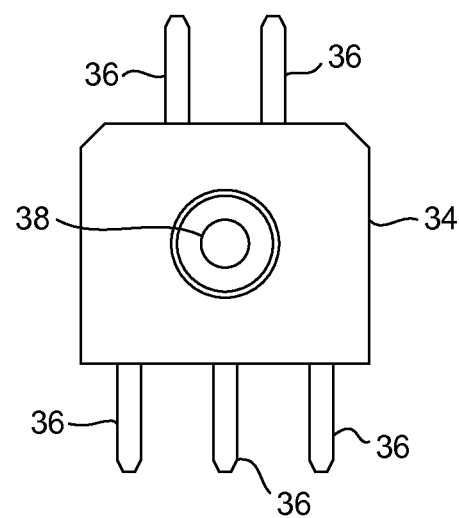
FIG. 4 is a front elevation view of an alternative molded plastic body.

An alternative embodiment for a similar molded plastic body 34 and lead frame arrangement is shown in FIG. 4. In the alternative embodiment, molded plastic body 34 has five leads 36 rather than three leads 28 as in the above-described embodiment. Note that some of leads 36 extend from the central region of the lead frame (not separately shown) in one direction, while others of leads 36 extend from the central region in an opposite direction. Molded plastic body 34 has a lens 38 and is otherwise identical to molded plastic body 30. In still other embodiments a lead frame can have any other number of leads extending in any other suitable directions away from the central region.

Figure 5:
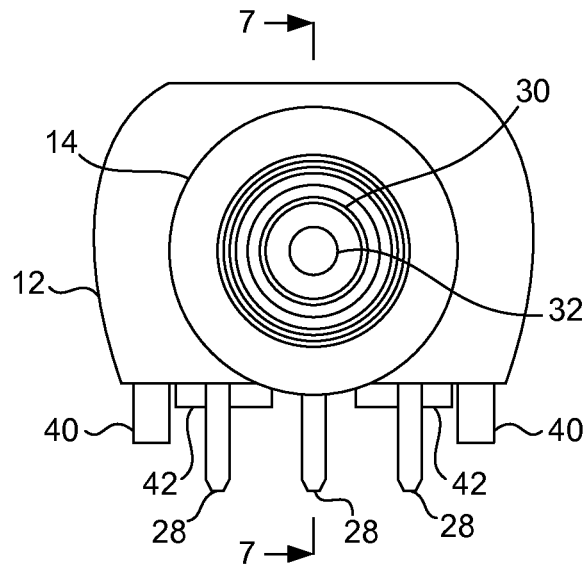
FIG. 5 is a front elevation view of the module of FIG. 1.
Figure 6:
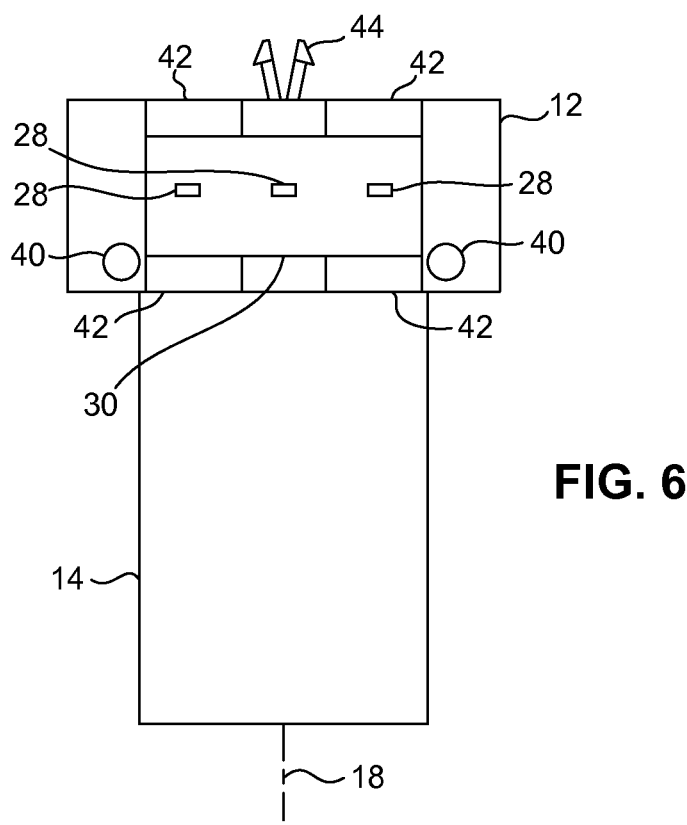
FIG. 6 is a bottom plan view of the module of FIG. 1.

As illustrated in FIGS. 5-6, molded plastic body 30 is housed in module body 12. The bottom of module body 12 (FIG. 6) is open to receive molded plastic body 30. A pair of posts 40 extend from the bottom of module body 12 that can be fitted within correspondingly located holes (not shown) in printed circuit board 20 (FIG. 1) to facilitate mounting. Standoffs or feet 42 similarly disposed on the bottom of module body 12 space module body 12 from the surface of printed circuit board 20. Barbed split retainer pins 44 (FIGS. 6-7) extend from the rear side of module body 12 to facilitate alternative mounting arrangements as described below.

Figure 7:
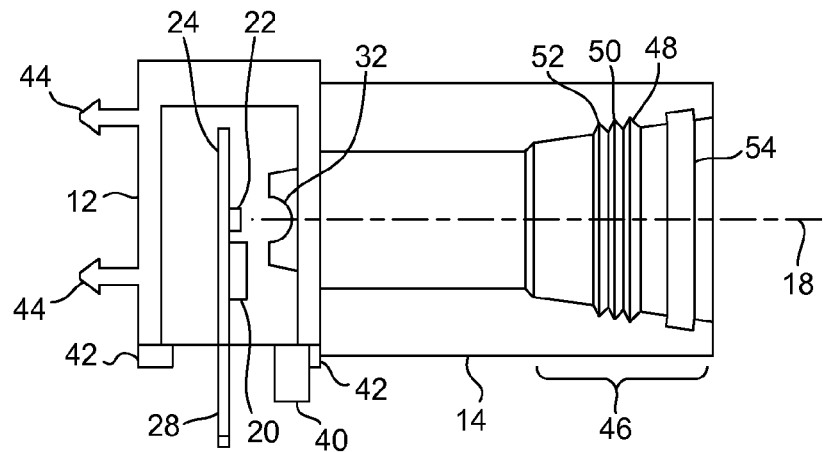
FIG. 7 is a sectional view taken on line 7-7 of FIG. 5.

As illustrated in FIG. 7, a tube portion 46 of fiber guide tube 14 has an interior region with a tapering diameter. Tube portion 46 has a fiber guide tube engagement comprising three circumferential grooves 48, 50 and 52 in an interior surface. Tube portion 46 also includes a retaining groove 54. Although in the exemplary embodiment tube portion 46 includes circumferential grooves 48, 50 and 52, in other embodiments such a portion of a fiber guide tube can have any other suitable type of tube engagements.

Figure 8:
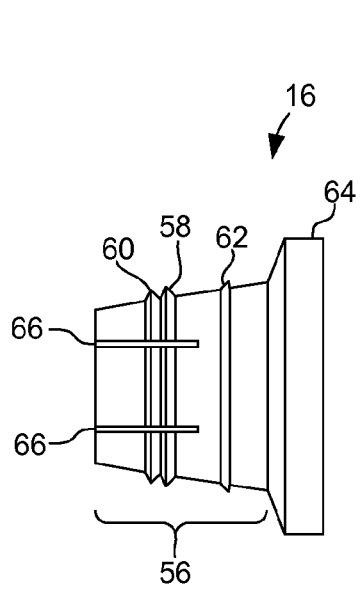
FIG. 8 is a side elevation view of a fiber clamp sleeve of the module assembly of FIG. 1.

As illustrated in FIG. 8, a barrel portion 56 of fiber clamp sleeve 16 has an exterior region with a tapering diameter. Barrel portion 56 has a fiber clamp sleeve engagement comprising two circumferential ridges or projections 58 and 60 in an exterior surface. Barrel portion 56 also includes a circumferential retainer 62 and a collar 64. Although in the exemplary embodiment barrel portion 56 includes circumferential projections 58 and 60, in other embodiments such a barrel portion of a fiber clamp sleeve can have any other suitable type of sleeve engagements. The distal end of barrel portion 56 has a number of (e.g., two or more) slots 66.

Figure 9:
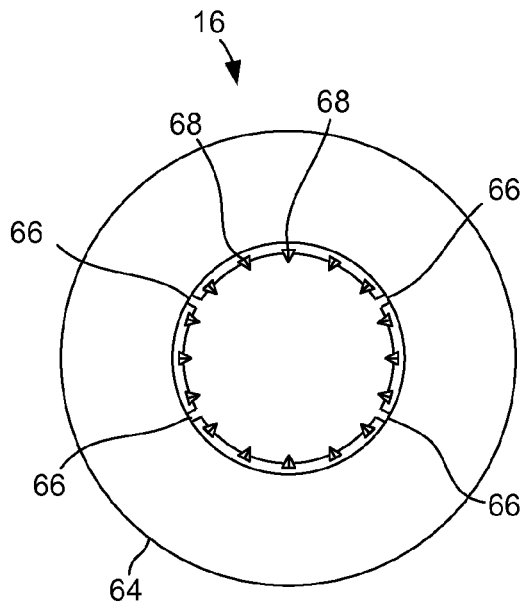
FIG. 9 is an end elevation view of the fiber clamp sleeve of FIG. 8.

As illustrated in FIG. 9, an interior region of barrel portion 56 has a number of (e.g., four or more) spiked protrusions 68 circumferentially distributed around a surface of the interior region. Spiked protrusions 68 in combination with portions of the interior region of barrel portion 56 from which they protrude define a fiber clamp that functions in a manner described below.

Figure 10:
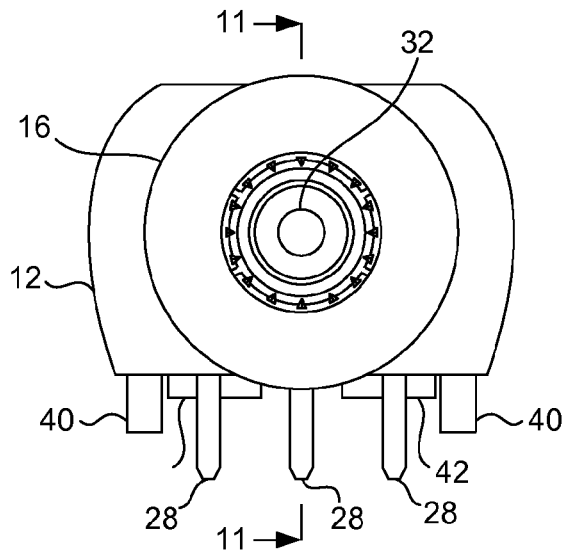
FIG. 10 is an end elevation view of the module assembly of FIG. 1.
Figure 11:
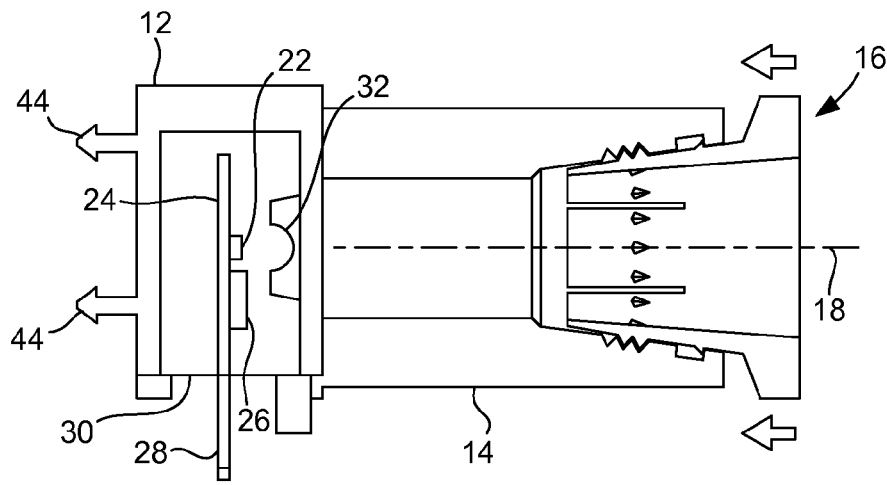
FIG. 11 is a sectional view taken on line 11-11 of FIG. 10, showing the module assembly in an unclamped state.

As illustrated in FIGS. 10-11, barrel portion 56 of fiber clamp sleeve 16 can be inserted into the open end of fiber guide tube 14 and pressed or urged together or into one another. Collar 64 of fiber clamp sleeve 16 can be used as a handle to facilitate insertion of barrel portion 56. Barrel portion 56 then can be further urged in a sliding manner in the direction indicated by the arrows (i.e., axially aligned with optical axis 18) until circumferential retainer 62 in barrel portion 56 snaps into engagement with retaining groove 54 in fiber guide tube 14 and the first and second circumferential projections 58 and 60 snap into engagement with the first and second circumferential grooves 48 and 50, respectively. For reasons described below, this state of engagement (shown in FIG. 11) between fiber clamp sleeve 16 and fiber guide tube 14 can be referred to as the unclamped state. Note that because circumferential retainer 62 has a ramped profile, the engagement between it and retaining groove 54 inhibits fiber clamp sleeve 16 from being withdrawn from fiber guide tube 14.

Beginning in the unclamped state (FIG. 11), the state of engagement between fiber clamp sleeve 16 and fiber guide tube 14 can be changed to a clamped state (FIG. 12) by further urging barrel portion 56 in a sliding manner in the direction indicated by the arrows in FIG. 11. That is, fiber clamp sleeve 16 and fiber guide tube 14 are further pressed together or into one another and slide with respect to one another. In the clamped state shown in FIG. 12, circumferential retainer 62 remains within retaining groove 54, but the second circumferential projection 60 snaps out of engagement with the second circumferential groove 50 and immediately snaps into engagement with the third circumferential groove 52, while the first circumferential projection 58 snaps out of engagement with the first circumferential groove 48 and immediately snaps into engagement with the second circumferential groove 50. Note that by pulling fiber clamp sleeve 16 and fiber guide tube 14 apart (i.e., the opposite of the above-described relative movement of fiber clamp sleeve 16 and fiber guide tube 14), the engagement between fiber clamp sleeve 16 and fiber guide tube 14 can be returned to the unclamped state. It should also be noted that the above-described snapping action is facilitated by the slightly resilient plastic or similar material of which fiber clamp sleeve 16, fiber guide tube 14, or both are made.

Figure 12:
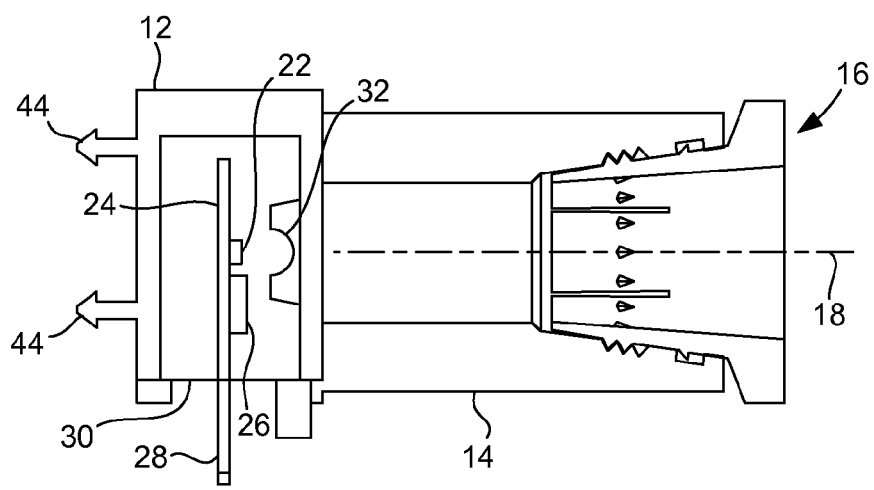
FIG. 12 is similar to FIG. 11, showing the module assembly in a clamped state.
Figure 13:
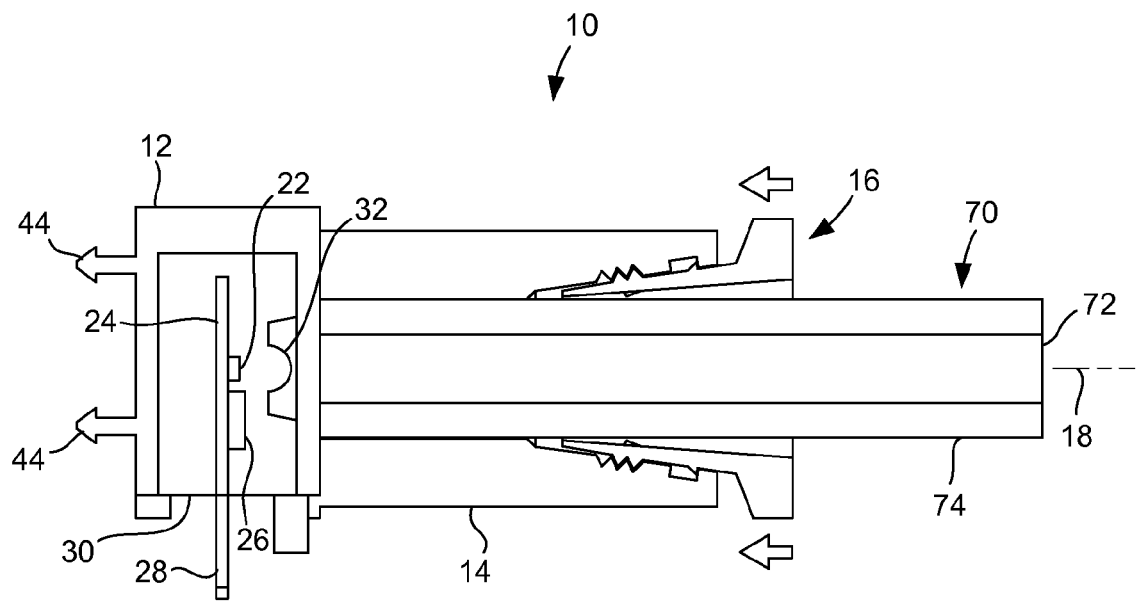
FIG. 13 is similar to FIG. 11, showing an optical fiber in the module assembly.
Figure 14:
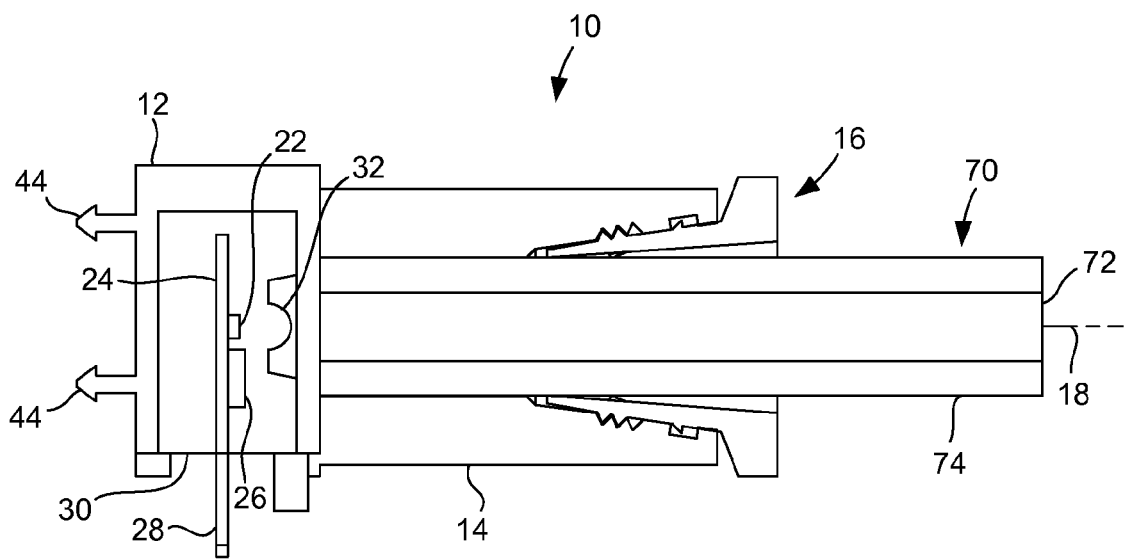
FIG. 14 is similar to FIG. 12, showing an optical fiber in the module assembly.

For purposes of clarity, fiber clamp sleeve 16 and fiber guide tube 14 are shown in the unclamped and clamped state in FIGS. 11-12 without the optical fiber 70 that is shown in corresponding FIGS. 13-14. Optical fiber 70 comprises an interior fiber 72 and an exterior buffer layer 74. With fiber clamp sleeve 16 and fiber guide tube 14 in the unclamped state of engagement shown in FIG. 13, optical fiber 70 can be freely inserted into the open end of fiber clamp sleeve 16 because spiked protrusions 68 or other portions of the fiber clamp do not frictionally engage buffer layer 74 to an extent sufficient to impede optical fiber 70 from being inserted (or withdrawn). However, when fiber clamp sleeve 16 and fiber guide tube 14 are changed to the clamped state of engagement shown in FIG. 14, the ramping action that occurs as the tapered barrel portion 56 slides further into the correspondingly tapered portion of fiber guide tube 14 radially squeezes or compresses the fiber clamp of barrel portion 56. That is, portions of the fiber clamp, including spiked protrusions 68, are urged in a radially inward direction, i.e., toward the optical axis. Stated another way, the distance between such portions of the fiber clamp and the optical axis is less in the clamped state than in the unclamped state. This distance is sufficient to accommodate or clear the diameter of optical fiber 70 in the unclamped state but not sufficient to accommodate or clear the diameter of optical fiber 70 in the clamped state. Spiked protrusions 68 bite into buffer layer 74 of optical fiber 70 to help retain optical fiber 70 within fiber guide tube 14. It can be noted that other portions of the fiber clamp, such as the extreme distal end of barrel portion 56, may similarly frictionally engage buffer layer 74 in the clamped state to further help retain optical fiber 70 within fiber guide tube 14.

Note that as barrel portion 56 is urged further into the tapered portion of fiber guide tube 14, the resulting radial compression of the fiber clamp squeezes slots 66, thus decreasing their width toward the distal end of barrel portion 56. Slots 66 thus help accommodate the radial compression of the fiber clamp. As fiber clamp sleeve 16 is made of a resilient plastic or similar material having some degree of resiliency, slots 66 return to their original width and the surrounding portions of the fiber clamp return to their uncompressed or unflexed state if fiber clamp sleeve 16 and fiber guide tube 14 are returned to the unclamped state.

Figure 15:
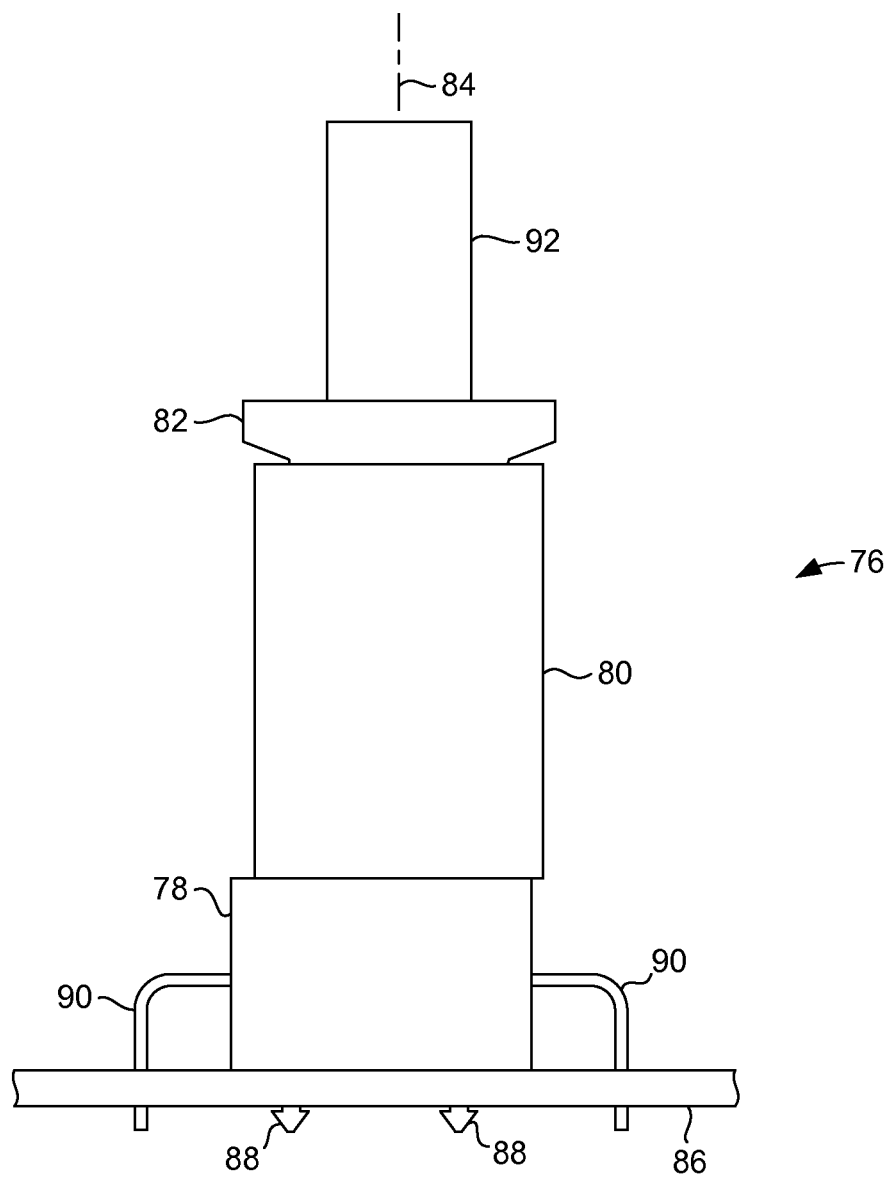
FIG. 15 is a side elevation view showing an alternative optical data communication module assembly, showing the module assembly mounted on a printed circuit board in accordance with another exemplary embodiment of the invention.

As illustrated in FIG. 15, in another exemplary embodiment, an optical data communication module assembly 76 includes a module body 78, a fiber guide tube 80, and a fiber clamp sleeve 82 that are similar to the above-described module body 12, fiber guide tube 14, and fiber clamp sleeve 16. In this embodiment, however, assembly 76 is mounted in an orientation in which the optical axis 84 is perpendicular to a printed circuit board 86. Module body 78 has barbed split retainers 88 that secure it to printed circuit board 86 and has electrical leads 90 similar to above-described electrical leads 28 but which are bent and received in plated through-hole conductors of printed circuit board 86. An optical fiber 92 can be retained in the same manner described above with regard to optical fiber 70 in the embodiment illustrated in FIGS. 1-14.

Figure 16:
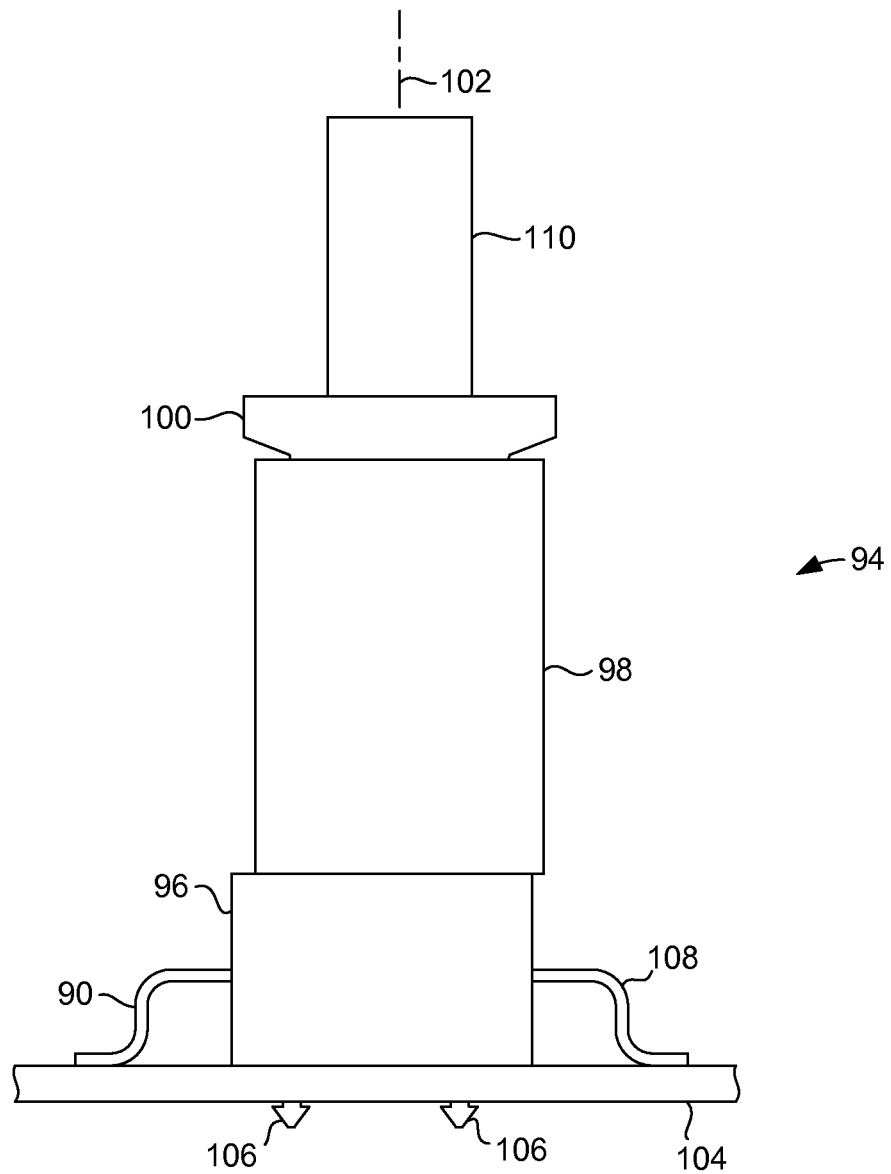
FIG. 16 is a side elevation view showing another alternative optical data communication module assembly, showing the module assembly mounted on a printed circuit board in accordance with another exemplary embodiment of the invention.

As illustrated in FIG. 16, in still another exemplary embodiment, an optical data communication module assembly 94 includes a module body 96, a fiber guide tube 98, and a fiber clamp sleeve 100 that are similar to the above-described body 12, fiber guide tube 14, and fiber clamp sleeve 16. Assembly 94 is mounted in the same orientation (with respect to an optical axis 102) as in the embodiment described above with regard to FIG. 15 and is secured to a printed circuit board 104 by barbed split retainers 106. In this embodiment, however, electrical leads 108 are bent to be surface-mounted to conductors of printed circuit board 104. An optical fiber 110 can be retained in the same manner described above with regard to optical fiber 70 in the embodiment illustrated in FIGS. 1-14.

Figure 17:
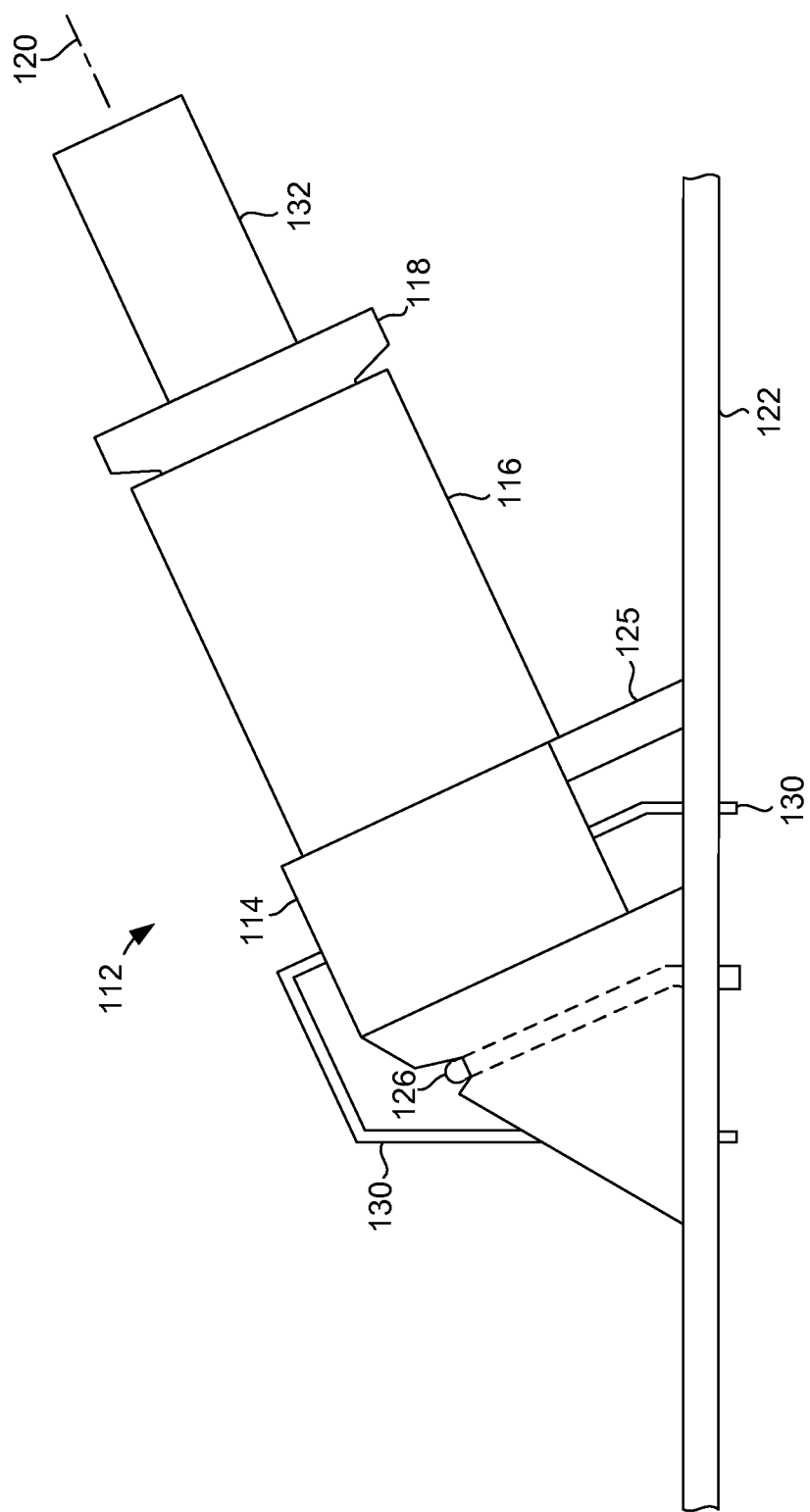
FIG. 17 is a side elevation view showing still another alternative optical data communication module assembly, showing the module assembly mounted on a printed circuit board in accordance with still another exemplary embodiment of the invention.
Figure 18:
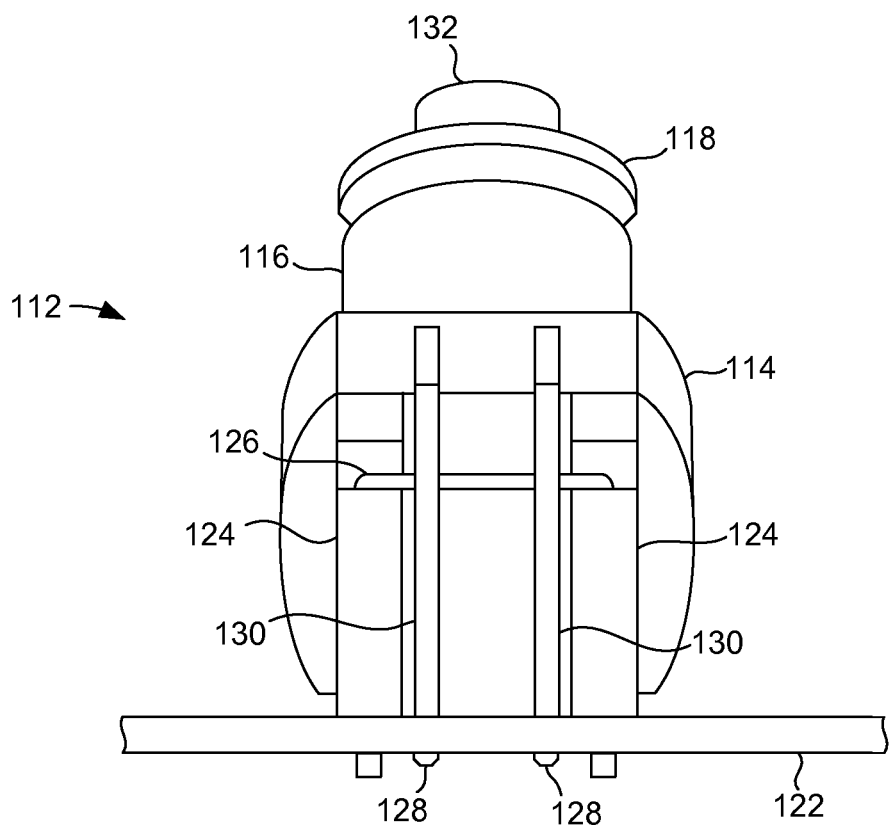
FIG. 18 is a rear elevation view of the module assembly of FIG. 17.

As illustrated in FIG. 17, in yet another exemplary embodiment, an optical data communication module assembly 112 includes a module body 114, a fiber guide tube 116, and a fiber clamp sleeve 118 that are similar to the above-described module body 12, fiber guide tube 14, and fiber clamp sleeve 16. In this embodiment, however, assembly 112 is mounted in an orientation in which the optical axis 120 is oriented at an acute angle (e.g., about 30 degrees) to a printed circuit board 122. As further illustrated in FIG. 18, this mounting arrangement is facilitated by a pair of triangular buttresses 124 and a support post 125. One side of each triangular buttress 124 is attached to the rear side of module body 114, and another side rests on printed circuit board 122. A U-shaped retainer 126 has arms that extend through each triangular buttress 124. Ends 128 of the arms extend into holes in printed circuit board 122 to secure assembly 112 to printed circuit board 122. Electrical leads 130 are bent to reach printed circuit board 122 and have ends that are received in plated through-hole conductors of printed circuit board 122. An optical fiber 132 can be retained in the same manner described above with regard to optical fiber 70 in the embodiment illustrated in FIGS. 1-14.

Figure 19:
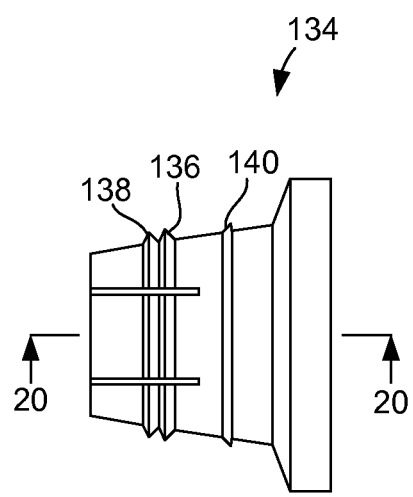
FIG. 19 is a side elevation view of an alternative fiber clamp sleeve.
Figure 20:
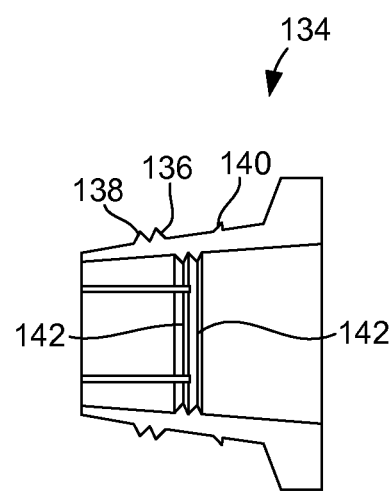
FIG. 20 is a sectional view taken on line 20-20 of FIG. 19.

As illustrated in FIGS. 19-20, a still further exemplary embodiment can include a fiber clamp sleeve 134 having an exterior that is similar to the exterior of above-described fiber clamp sleeve 16 but a different interior. Similarly to the above-described embodiments, the exterior of fiber clamp sleeve 134 has two circumferential ridges or projections 136 and 138 and a circumferential retainer 140. However, in this embodiment the fiber clamp comprises two circumferential projections 142 on the interior surface (FIG. 20) of fiber clamp sleeve 134.

Figure 21:
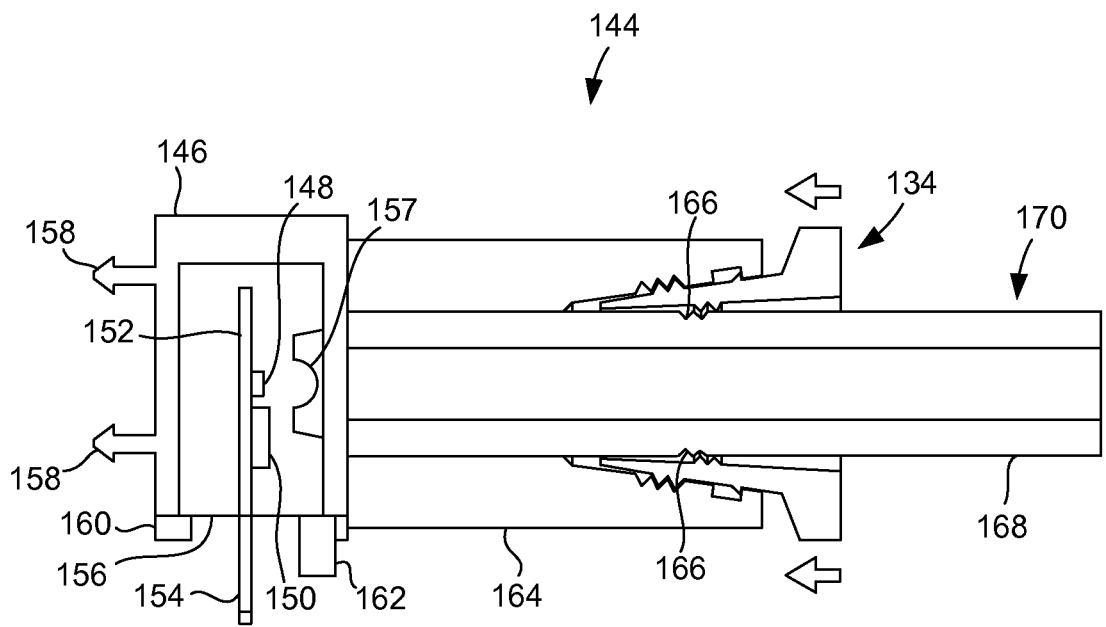
FIG. 21 is a sectional view similar to FIG. 13 but showing an alternative module assembly having the fiber clamp sleeve of FIG. 19, in accordance with yet another exemplary embodiment of the invention.
Figure 22:
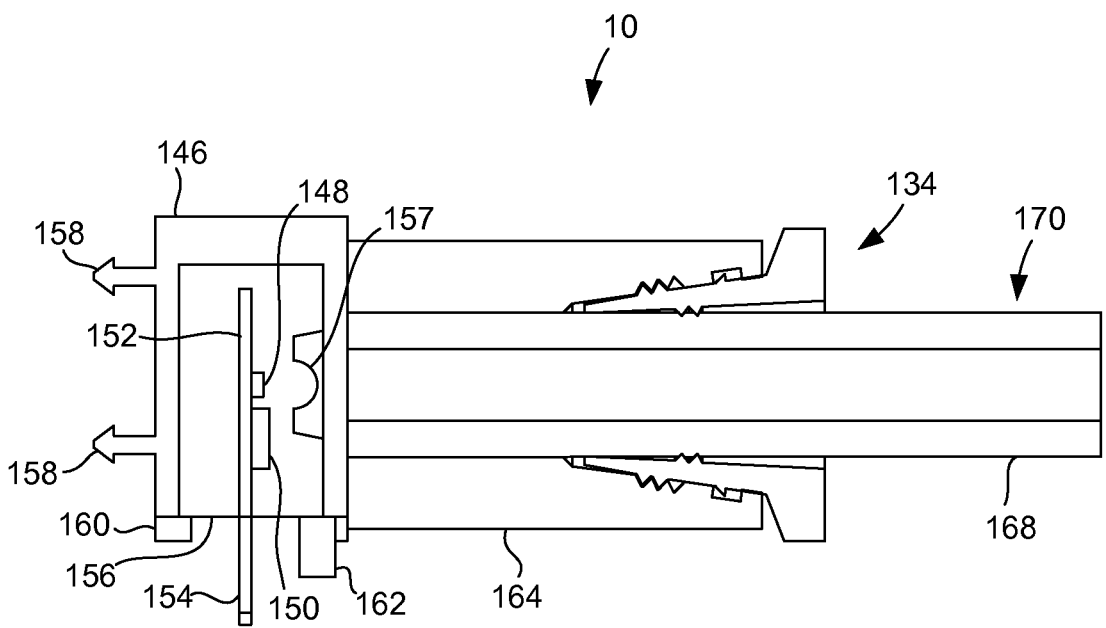
FIG. 22 is a sectional view similar to FIG. 14 but with the alternative module assembly of FIG. 21.

As illustrated in FIGS. 21-22, except for having a different fiber clamp sleeve 134, the optical data communication module assembly 144 is similar to optical data communication module assembly 10 described above with regard to the embodiment illustrated in FIGS. 1-14. Accordingly, a module body 146 is similar to above-described module body 12 in that module body 146 includes an opto-electronic converter chip 148 and processing chip 150 mounted on a lead frame 152 having electrical leads 154, all encapsulated in a molded plastic body 156 with a lens 157. Module body 12 further includes a pair of barbed split retainer pins 158, feet 160, and posts 162 that are similar to the corresponding elements described above with regard to the embodiment illustrated in FIGS. 1-14. A fiber guide tube 164 is also similar to fiber guide tube 16 described above with regard to the embodiment illustrated in FIGS. 1-14.

In the embodiment illustrated in FIGS. 19-22, when fiber guide tube 164 and fiber clamp sleeve 134 are engaged in the clamped state (FIG. 22), circumferential projections 142 (FIG. 20) engage notches 166 (FIG. 23) in the buffer layer 168 of an optical fiber 170 sufficiently to inhibit optical fiber 170 from being withdrawn from fiber guide tube 164. In the unclamped state (FIG. 21), circumferential projections 142 (FIG. 20) do not engage notches 166 (FIG. 23), and thus optical fiber 170 can be freely inserted into and withdrawn from fiber guide tube 164.

Notches 166 can be formed in any suitable manner. For example, a cutting tool 172 having teeth 174 can be used. Optical fiber 170 is inserted into a fiber holder 176, and cutting tool 172 is inserted into a slot 178 in fiber holder 176 over optical fiber 170. As cutting tool 172 is inserted into slot 178, teeth 174 cut notches 166 in optical fiber 170. Cutting tool 172 is then removed from slot 178, and optical fiber 170 is removed from fiber holder 176.

It should be noted that the invention has been described with respect to illustrative embodiments for the purpose of describing the principles and concepts of the invention. The invention is not limited to these embodiments. As will be understood by those skilled in the art in view of the description being provided herein, many modifications may be made to the embodiments described herein without deviating from the goals of the invention, and all such modifications are within the scope of the invention.

What is claimed is:

1. An optical data communication module assembly, comprising:
   an optical data communication module having a mountable module body, a leadframe, and an opto-electronic converter semiconductor chip mounted in the module body on a substantially planar central region of the leadframe, electrical leads of the leadframe extending to an exterior of the module body;
   a fiber guide tube aligned with the opto-electronic converter along an optical axis extending from the module body in a direction normal to the central region of the leadframe, an interior region of the fiber guide tube having a portion with a tapering diameter, the interior region of the fiber guide tube having a fiber guide tube engagement feature located along the portion of the interior region with the tapering diameter; and
   a fiber clamp sleeve having a collar outside the fiber guide tube and a tapering barrel portion slidable within the portion of the fiber guide tube having the tapering diameter, an exterior region of the barrel portion having a fiber clamp sleeve engagement feature selectably engageable with the fiber guide tube engagement feature in response to the barrel portion sliding within the portion of the fiber guide tube having the tapering diameter to retain the fiber clamp sleeve in fixed relation to fiber guide tube, an interior region of the barrel portion having a fiber clamp displaceable in a radially inward direction in response to movement of the fiber guide tube engagement feature and fiber clamp sleeve engagement feature into engagement with each other.

2. The optical data communication module assembly of claim 1, wherein the module body comprises:
   a housing; and
   a unitarily molded plastic body encapsulating the opto-electronic converter semiconductor chip and the central region of the leadframe and having a lens aligned with the opto-electronic converter along the optical axis, the unitarily molded plastic body disposed within the housing.

3. The optical data communication module assembly of claim 1, wherein the fiber clamp comprises at least four spiked protrusions circumferentially distributed around a surface of the interior region of the barrel portion of the fiber clamp sleeve.

4. The optical data communication module assembly of claim 1, wherein the fiber clamp comprises a circumferential projection on a surface of the interior region of the barrel portion of the fiber clamp sleeve.

5. The optical data communication module assembly of claim 1, wherein a distal end of the barrel portion of the fiber clamp sleeve has a plurality of slots resiliently decreasable in width in response to resilient compression of the distal end of the barrel portion in a radially inward direction.

6. The optical data communication module assembly of claim 1, wherein:
   the fiber guide tube engagement comprises a first tube engagement, a second tube engagement and a third tube engagement on a surface of the interior region of the fiber guide tube; and
   the fiber clamp sleeve engagement comprises a first sleeve engagement and a second sleeve engagement on a surface of the exterior region of the barrel portion of the fiber clamp sleeve.

7. The optical data communication module assembly of claim 6, wherein:
   the fiber clamp sleeve is retainable in fixed relation to the fiber guide tube in an unclamped state wherein a portion of the fiber clamp extends to a first distance from the optical axis and retainable in fixed relation to the fiber guide tube in a clamped state wherein a portion of the fiber clamp extends to a second distance from the optical axis, and the second distance is less than the first distance;
   the first sleeve engagement engages the first tube engagement and the second sleeve engagement engages the second tube engagement when the fiber clamp sleeve is retained in fixed relation to fiber guide tube in the unclamped state; and
   the first sleeve engagement engages the second tube engagement and the second sleeve engagement engages the third tube engagement when the fiber clamp sleeve is retained in fixed relation to the fiber guide tube in the clamped state.

8. The optical data communication module assembly of claim 7, wherein:
   each of the first tube engagement, the second tube engagement and the third tube engagement comprises one of a circumferential groove and a circumferential projection on a surface of the interior region of the fiber guide tube; and
   each of the first sleeve engagement and the second sleeve engagement comprises another of the circumferential groove and a circumferential projection on a surface of the exterior region of the barrel portion of the fiber clamp sleeve.

9. The optical data communication module assembly of claim 8, wherein:
the third tube engagement is closer to the module body than the second and first tube engagements and has a diameter less than a diameter of the first tube engagement; and
the second sleeve engagement is closer to the module body than the first tube engagement and has a diameter less than a diameter of the first tube engagement.

10. The optical data communication module assembly of claim 8, wherein the fiber clamp comprises at least four spiked protrusions circumferentially distributed around a surface of the interior region of the barrel portion of the fiber clamp sleeve.

11. The optical data communication module assembly of claim 8, wherein the fiber clamp comprises a circumferential projection on a surface of the interior region of the barrel portion of the fiber clamp sleeve.

12. The optical data communication module assembly of claim 8, wherein a distal end of the barrel portion of the fiber clamp sleeve has a plurality of slots resiliently decreasable in width in response to resilient compression of the distal end of the barrel portion in a radially inward direction.

13. The optical data communication module assembly of claim 1, wherein the module housing comprises a printed circuit board mount on a side of the module housing substantially parallel to the optical axis to orient the module housing with the optical axis substantially parallel to a surface of a printed circuit board.

14. The optical data communication module assembly of claim 1, wherein the module housing comprises a printed circuit board mount on a side of the module housing substantially perpendicular to the optical axis to orient the module housing with the optical axis substantially perpendicular to a surface of a printed circuit board.

15. The optical data communication module assembly of claim 1, wherein the module housing comprises an printed circuit board mount having a printed circuit board attachment side oriented at an acute angle to a module housing attachment side to orient the module housing with the optical axis at an acute angle to a surface of a printed circuit board.

16. A method for using an optical data communication module assembly, the optical data communication module assembly comprising a module body, a fiber guide tube, and a fiber clamp sleeve, the module body including a leadframe, and an opto-electronic converter semiconductor chip mounted in the module body on a substantially planar central region of the leadframe, the fiber guide tube aligned with the opto-electronic converter along an optical axis extending from the module body in a direction normal to the central region of the leadframe, the method comprising:
mounting the module body;
inserting a tapering barrel portion of the fiber clamp sleeve into an interior region of the fiber guide tube having a portion with a tapering diameter; and
inserting an optical fiber into the barrel portion of the fiber clamp sleeve until an end of the optical fiber reaches the module body;
sliding the barrel portion within the portion of the fiber guide tube having the tapering diameter until a fiber clamp sleeve engagement feature on an exterior region of the barrel portion engages a complimentary fiber guide tube engagement feature located along the portion of the interior region of the fiber guide tube with the tapering diameter and the fiber clamp sleeve is retained in fixed relation to fiber guide tube and until a fiber clamp on an interior region of the barrel portion is displaced in a radially inward direction.

17. The method of claim 16, wherein the fiber clamp is displaced in a radially inward direction by displacement of at least four spiked protrusions circumferentially distributed around a surface of the interior region of the barrel portion of the fiber clamp sleeve.

18. The method of claim 16, the fiber clamp is displaced in a radially inward direction by displacement a circumferential projection on a surface of the interior region of the barrel portion of the fiber clamp sleeve.

19. The method of claim 16, wherein a width of each of a plurality of slots in a distal end of the barrel portion of the fiber clamp sleeve is resiliently decreased in response to resilient compression of the distal end of the barrel portion in a radially inward direction by the barrel portion sliding within the portion of the fiber guide tube having the tapering diameter.

20. The method of claim 16, wherein sliding the barrel portion within the portion of the fiber guide tube having the tapering diameter comprises:
sliding the barrel portion until the fiber clamp sleeve is retained in fixed relation to the fiber guide tube in an unclamped state wherein a portion of the fiber clamp extends to a first distance from the optical axis and wherein a first sleeve engagement of the fiber clamp sleeve engagement engages a first tube engagement of the fiber guide tube engagement and a second sleeve engagement of the fiber clamp sleeve engagement engages a second tube engagement of the fiber guide tube engagement; and
further sliding the barrel portion until the fiber clamp sleeve is retained in fixed relation to the fiber guide tube in a clamped state wherein a portion of the fiber clamp extends to a second distance from the optical axis, and the second distance is less than the first distance, and wherein the first sleeve engagement engages the second tube engagement and the second sleeve engagement engages a third tube engagement of the fiber guide tube engagement.

21. The method of claim 20, wherein:
the first sleeve engagement engages the first tube engagement of the fiber guide tube engagement by a first circumferential projection engaging a first circumferential groove;
the second sleeve engagement engages the second tube engagement by a second circumferential projection engaging a second circumferential groove;
the first sleeve engagement engages the second tube engagement by the first circumferential projection engaging the second circumferential groove; and
the second sleeve engagement engages the third tube engagement by the second circumferential projection engaging a third circumferential groove.

22. The method of claim 16, wherein mounting the module housing comprises mounting the module housing to a printed circuit board to orient the module housing with the optical axis substantially parallel to a surface of a printed circuit board and with electrical leads of the leadframe extending from the module body to the printed circuit board.

23. The method of claim 16, wherein mounting the module housing comprises mounting the module housing to a printed circuit board to orient the module housing with the optical axis substantially perpendicular to a surface of a printed circuit board and with electrical leads of the leadframe extending from the module body to the printed circuit board.

24. The method of claim 16, wherein mounting the module housing comprises mounting the module housing to a printed circuit board to orient the module housing with the optical axis at an acute angle to a surface of a printed circuit board and with electrical leads of the leadframe extending from the module body to the printed circuit board.

\* \* \* \* \*